US009128903B2

(12) United States Patent
Takemoto

(10) Patent No.: US 9,128,903 B2
(45) Date of Patent: Sep. 8, 2015

(54) COMPUTER SYSTEM, ACTIVE SYSTEM COMPUTER, AND STANDBY SYSTEM COMPUTER

(75) Inventor: Taira Takemoto, Tokyo (JP)

(73) Assignee: NEC CORPORATION, Tokyo (JP)

(*) Notice: Subject to any disclaimer, the term of this patent is extended or adjusted under 35 U.S.C. 154(b) by 227 days.

(21) Appl. No.: 13/578,889

(22) PCT Filed: Oct. 13, 2010

(86) PCT No.: PCT/JP2010/006095
§ 371 (c)(1),
(2), (4) Date: Aug. 14, 2012

(87) PCT Pub. No.: WO2011/111131
PCT Pub. Date: Sep. 15, 2011

(65) Prior Publication Data
US 2012/0324300 A1      Dec. 20, 2012

(30) Foreign Application Priority Data

Mar. 8, 2010  (JP) .................................. 2010-050784

(51) Int. Cl.
G06F 11/00    (2006.01)
G06F 11/20    (2006.01)
G06F 11/16    (2006.01)

(52) U.S. Cl.
CPC ........ *G06F 11/2097* (2013.01); *G06F 11/1662* (2013.01); *G06F 11/2023* (2013.01); *G06F 11/2038* (2013.01)

(58) Field of Classification Search
CPC ............ G06F 11/2097; G06F 11/2074; G06F 11/2023; G06F 11/2028; G06F 11/1446
USPC .................................................. 714/4.11, 13
See application file for complete search history.

(56) References Cited

U.S. PATENT DOCUMENTS 6,684,306 B1 *  1/2004  Nagasawa et al. ............. 711/162
6,978,347 B2 * 12/2005  Nakamura et al. ............ 711/114
(Continued)

FOREIGN PATENT DOCUMENTS

CN        1627693 A      6/2005
JP     2001236258 A      8/2001
(Continued)

OTHER PUBLICATIONS

Japanese Office Action for JP Application No. 2012-504164 mailed on Oct. 1, 2013 with English Translation.
(Continued)

*Primary Examiner* — Loan L. T. Truong
(74) *Attorney, Agent, or Firm* — Sughrue Mion, PLLC

(57) ABSTRACT

Upon a receipt of an advance notice, an active system computer on which asynchronous replication is performed with a standby system computer stops a business application and transmits to the standby system computer transmission start information indicating start of data synchronization, data accumulated in a transmission queue 118, and transmission completion information indicating completion of the data synchronization in this order. The standby system computer generates and holds first reliability guarantee information indicating that the data received before the transmission start information upon a receipt of the transmission start information, and generates and holds second reliability guarantee information indicating that the data received before the transmission completion information is reliable data upon a receipt of the transmission completion information. Accordingly, while taking advantages of the asynchronous replication to the data replication, reliability of data backed up on the standby system computer is guaranteed upon a failure.

6 Claims, 10 Drawing Sheets

(56) References Cited

U.S. PATENT DOCUMENTS

| | | | |
|---|---|---|---|
| 7,240,238 B2 | 7/2007 | Yanai et al. | |
| 7,266,665 B2* | 9/2007 | Stanley et al. | 711/173 |
| 7,716,438 B2* | 5/2010 | Ushijima et al. | 711/162 |
| 7,822,922 B2* | 10/2010 | Eng et al. | 711/114 |
| 8,131,924 B1* | 3/2012 | Frandzel et al. | 711/113 |
| 8,448,014 B2* | 5/2013 | Gawor et al. | 714/4.11 |
| 8,484,503 B2* | 7/2013 | Akirav et al. | 714/3 |
| 2003/0131278 A1* | 7/2003 | Fujibayashi | 714/6 |
| 2003/0212789 A1* | 11/2003 | Hamel et al. | 709/225 |
| 2004/0010668 A1 | 1/2004 | Inagaki et al. | |
| 2005/0193041 A1* | 9/2005 | Bourbonnais et al. | 707/204 |
| 2005/0193245 A1* | 9/2005 | Hayden et al. | 714/13 |
| 2007/0174484 A1 | 7/2007 | Lussier et al. | |
| 2008/0019316 A1* | 1/2008 | Imai | 370/331 |
| 2008/0126857 A1* | 5/2008 | Basham et al. | 714/25 |
| 2009/0320049 A1* | 12/2009 | Thiel et al. | 719/328 |
| 2010/0107158 A1* | 4/2010 | Chen et al. | 718/1 |
| 2010/0235326 A1* | 9/2010 | Fashchik et al. | 707/656 |
| 2010/0287407 A1* | 11/2010 | Basu et al. | 714/6 |
| 2010/0318837 A1* | 12/2010 | Murphy et al. | 714/4 |
| 2010/0332449 A1* | 12/2010 | Holenstein et al. | 707/615 |
| 2011/0078121 A1 | 3/2011 | Eguchi et al. | |
| 2011/0099342 A1* | 4/2011 | Ozdemir | 711/162 |
| 2011/0131318 A1* | 6/2011 | Maes | 709/224 |
| 2012/0057591 A1* | 3/2012 | Erman et al. | 370/389 |
| 2012/0079222 A1* | 3/2012 | Phelps et al. | 711/162 |
| 2012/0084260 A1* | 4/2012 | Cherkauer et al. | 707/648 |
| 2012/0109919 A1* | 5/2012 | Park et al. | 707/703 |
| 2012/0124311 A1* | 5/2012 | Winokur | 711/162 |

FOREIGN PATENT DOCUMENTS

| | | |
|---|---|---|
| JP | 2002-169738 A | 6/2002 |
| JP | 2004005066 A | 1/2004 |
| JP | 2004326365 A | 11/2004 |
| JP | 2004334713 A | 11/2004 |
| JP | 2005222110 A | 8/2005 |
| JP | 2007094925 A | 4/2007 |
| JP | 2008310517 A | 12/2008 |

OTHER PUBLICATIONS

The international search report for PCT/JP2010/006095.
The extended European search report EP for Application No. 10847364.6 dated on Jul. 30, 2013.
Chinese Office Action for CN Application No. 201080065267.9 issued on Jul. 11, 2014 with English Translation.

* cited by examiner

| TRANSMISSION START INFORMATION | TRANSMISSION COMPLETION INFORMATION | FIRST RELIABILITY GUARANTEE INFORMATION | SECOND RELIABILITY GUARANTEE INFORMATION | MEANING |
|---|---|---|---|---|
| × | × | × | × | ADVANCE NOTICE NOT RECEIVED |
| ○ | × | ○ | × | ADVANCE NOTICE RECEIVED BUT DATA SYNCHRONIZATION INCOMPLETE |
| ○ | ○ | ○ | ○ | ADVANCE NOTICE RECEIVED AND DATA SYNCHRONIZATION COMPLETELY PERFORMED |

TIME 0

| WRITE DATA | WRITE TIME | TEMPORARY HOLD TIME INFORMATION |
|---|---|---|
| . | . | |
| . | . | TIME 0 |
| . | . | |
| DATA 0 | TIME 0 | |

⇩

TIME 1

| WRITE DATA | WRITE TIME | TEMPORARY HOLD TIME INFORMATION |
|---|---|---|
| . | . | |
| . | . | TIME 1 |
| . | . | |
| DATA 0 | TIME 0 | |
| DATA 1 | TIME 1 | |

⇩

TIME 2

| WRITE DATA | WRITE TIME | TEMPORARY HOLD TIME INFORMATION |
|---|---|---|
| . | . | |
| . | . | TIME 2 |
| . | . | |
| DATA 0 | TIME 0 | |
| DATA 1 | TIME 1 | |
| DATA 2 | TIME 2 | |

⇩

TIME 3

| WRITE DATA | WRITE TIME | TEMPORARY HOLD TIME INFORMATION |
|---|---|---|
| . | . | |
| . | . | TIME 3 |
| . | . | |
| DATA 0 | TIME 0 | |
| DATA 1 | TIME 1 | |
| DATA 2 | TIME 2 | |
| DATA 3 | TIME 3 | |

↓ TIME

| SYNCHRONIZATION START PACKET | SYNCHRONIZATION COMPLETION PACKET | ADDITIONAL TIME INFORMATION OF SYNCHRONIZATION START PACKET | TEMPORARY HOLD TIME INFORMATION OF SYNCHRONIZATION COMPLETION PACKET | MEANING |
|---|---|---|---|---|
| × | × | × | × | ADVANCE NOTICE NOT RECEIVED |
| ○ | × | ○ | × | ADVANCE NOTICE RECEIVED BUT DATA SYNCHRONIZATION INCOMPLETE |
| ○ | ○ | ○ | ○ | ADVANCE NOTICE RECEIVED AND DATA SYNCHRONIZATION COMPLETELY PERFORMED |

Fig. 7

COMPUTER SYSTEM, ACTIVE SYSTEM COMPUTER, AND STANDBY SYSTEM COMPUTER

TECHNICAL FIELD

The present invention relates to a backup technique for data in a computer system that replicates data, especially in an asynchronous method.

BACKGROUND ART

In the field of computer systems including a plurality of computers, techniques have been suggested from various viewpoints in regard to measures against failures.

For example, the computer system disclosed in Patent Literature 1 includes failure prediction means for predicting a failure in the computer, and the failure prediction means normally stops all services operating on the computer that is predicted to generate the failure as well as re-executes those services on another computer. Then, after all the services are re-executed on another computer, the failure prediction means stops the computer predicted to generate the failure.

This computer system is explained to transfer the services operating on the computer that is predicted to generate the failure before the failure occurs on the computer and normally stop the computer predicted to generate the failure without intervention of a system administrator.

Further, in a computer backup system disclosed in Patent Literature 2, a business computer (active system computer) includes an abnormality detecting sensor for detecting a breakdown sign in the computer and transmits electronic information that should be backed up to a backup computer via a network upon detection of the sign. When the backup computer receives the electronic information from the business computer, the backup computer saves the electronic information to a storage medium included therein.

This backup computer is explained to save the electronic information created on the business computer immediately before a disaster strikes.

Moreover, in a database system disclosed in Patent Literature 3, an active system device includes an active system TM (Transaction Manager) for processing transactions and an active system DBMS (Data Base Management System) for reflecting update data generated by the transaction. The standby system device includes a standby system TM that is notified of the update data from the active system TM and a standby system DBMS that synchronizes data content stored to the active system DBMS. The active system TM notifies the active system DBMS of the update data generated by executing the transactions as well as notifies the standby system TM by synchronous communication. The active system DBMS reflects the update data notified from the active system TM in a database managed by itself as well as notifies the standby system DBMS of the update data by asynchronous communication. The standby system TM stores the notified update data to a difference file, reads the update data from the difference file at a predetermined trigger, and notifies the standby system DBMS. The standby system DBMS reflects the update data obtained from the active system DBMS or the standby system TM in the database managed by itself.

According to this database system, when a synchronization technique of the database is used in which one computer organizes and transmits the update data together with control information of the update data while another computer assembles the update data based on the control information, and the update data is returned to the unit of transaction and reflected in another database, in the case of the failure during the process to organize the update data by one computer, it has been explained that the problem can be solved in which the database on one computer and the database on another computer cannot be synchronized, and thereby improving the reliability of database synchronization.

Note that although in the systems disclosed in Patent Literature 1 and 2, failure occurrence in the active system computer is learned by the abnormality detecting sensor or the failure prediction means included in the systems, for example as disclosed in Patent Literature 4, the technique is known for learning the failure occurrence by receiving disaster notification information that notifies predicted occurrence of disaster.

CITATION LIST

Patent Literature

Patent Literature 1: Japanese Unexamined Patent Application Publication No. 2004-334713
Patent Literature 2: Japanese Unexamined Patent Application Publication No. 2004-326365
Patent Literature 3: Japanese Unexamined Patent Application Publication No. 2008-310517
Patent Literature 4: Japanese Unexamined Patent Application Publication No. 2007-094925

SUMMARY OF INVENTION

Technical Problem

Replication of data in order to avoid the failure (hereinafter referred to as data replication) is focused here. In preparation for avoiding the failure, the aforementioned so-called data replication is required for backing up new data generated by executing an application on the active system computer to a standby system computer.

Synchronous replication and asynchronous replication is two major techniques known as data replication between the active system computer and the standby system computer.

The synchronous replication means that the active system computer synchronizes with generation of data to be updated, transmits the data to the standby system computer, and causes the standby system computer to save the data.

The asynchronous replication means that control is returned to an application that performed writing before transmitting the generated data to be updated to the standby system computer and then the data to be updated is transmitted to the standby system computer, instead that the control is returned to the application that performed writing after synchronizing with the generation of data to be updated and transmitting the data to the standby system computer. The generated data to be updated may be temporarily accumulated and the accumulated data may be collectively transmitted to the standby system computer at a predetermined trigger.

According to the system using the asynchronous replication to the data replication, there is an advantage that it is possible to reduce communication latency for data replication in the active system computer. However, there has been a problem when the failure occurs that data not transmitted yet from the active system computer to the standby system computer is lost and a recovery process for the lost data is required upon carrying out business operations by switching the standby system computer to the active system computer later on, thereby taking a long time to resume the operations.

The technique disclosed in Patent Literature 1 stops all the services executed on the computer predicted to generate the failure as well as stops the computer predicted to generate the failure after these services are re-executed on another computer. Although there is no specific disclosure regarding the data replication in Patent Literature 1, assume that the asynchronous replication is used for the data replication, it is necessary to transmit the data not transmitted yet to another computer up to point when the failure is predicted in order to re-execute all the services executed on the computer that is predicted to generate the failure.

However, when the failure occurs before completing the above process, there is no way to know to what extent the data on the computer predicted to generate the failure has been transmitted, and thereby posing a problem in resuming the services on another computer.

Further, the technique disclosed in Patent Literature 2 transmits the data in the business computer to the backup computer when the abnormality detecting sensor detects the breakdown sign in the business computer. This technique would be ultimate asynchronous replication. This technique also has a problem similar to the one mentioned in the explanation of the technique according to Patent Literature 1 when the failure occurs during the time from detecting the breakdown sign in the business computer until the data transmission to the backup computer is completed.

The technique disclosed in Patent Literature 3 substantially solves the above problem of the asynchronous replication by using both the synchronous replication and the asynchronous replication to the data replication. However, this creates a problem of limiting the advantage in the asynchronous replication.

The present invention is made in view of the abovementioned situation and provides a replication technique that takes advantage of the asynchronous replication in the data replication and also guarantees reliability of the data backed up on the standby system computer upon the failure.

Solution to Problem

An aspect of the present invention is an active system computer on which a business application is executed, and asynchronous replication of data generated by executing the business application is performed between the active system computer and the standby system computer.

The active system computer includes a storage device for the business application to write data in, a transmission queue, a receiving unit, a control unit, and a transmitting unit.

The transmission queue queues the data not transmitted yet to the standby system computer among the data written to the storage device by the business application. The receiving means receives an advance notice for giving a failure prediction.

The control means stops the execution of the business application when the receiving means receives the advance notice.

The transmitting means transmits to the standby system computer transmission start information indicating start of data transmission for failure avoidance, the data queued in the transmission queue, and transmission completion information indicating completion of the data transmission in this order when the receiving means receives the advance notice.

Another aspect of the present invention is a standby system computer on which asynchronous replication of data is performed with the active system computer where a business application is executed, in which the data is generated by executing the business application on the active system computer.

This standby system computer includes a storage device and a backup unit that writes the data from the active system computer to the storage device along with the asynchronous replication.

The backup unit, upon a receipt of transmission start information, writes the data received after the transmission start information to the storage device as well as generates and holds first reliability guarantee information indicating that the data received before the transmission start information is reliable data. The transmission start information is information indicates start of "data transmission" performed for failure avoidance when the active system computer receives an advance notice for giving a failure prediction, and the "data transmission" means transmission of the data not transmitted yet to the standby system computer.

Further, the backup unit, upon a receipt of transmission completion information to be transmitted after the aforementioned "data transmission" is completed, generates and holds second reliability information indicating that the data received before the transmission completion information is reliable data.

Note that a method, a device, or a system replacing the active system computer or the standby system computer according to the above aspects, a program that causes a computer to execute an operation of the active system computer or the standby system computer, a computer readable recording medium recording the program, a computer system including the active system computer and the standby system computer, and the like are also effective as the aspects of the present invention.

Advantageous Effects of Invention

According to the technique of the present invention, it is possible to take advantage of the asynchronous replication in the data replication and also guarantees reliability of data backed up on the standby system computer upon a failure.

BRIEF DESCRIPTION OF DRAWINGS

FIG. 2 is a diagram for explaining meaning such as transmission start information in the computer system shown in FIG. 1;

FIG. 5 is a diagram for explaining a relationship between write time of write data queued in a transmission queue of the computer shown in FIG. 4 and temporary hold time information;

FIG. 7 is a diagram for explaining meaning of a synchronization start packet in the computer system shown in FIG. 3;

DESCRIPTION OF EMBODIMENTS

Figure 1:
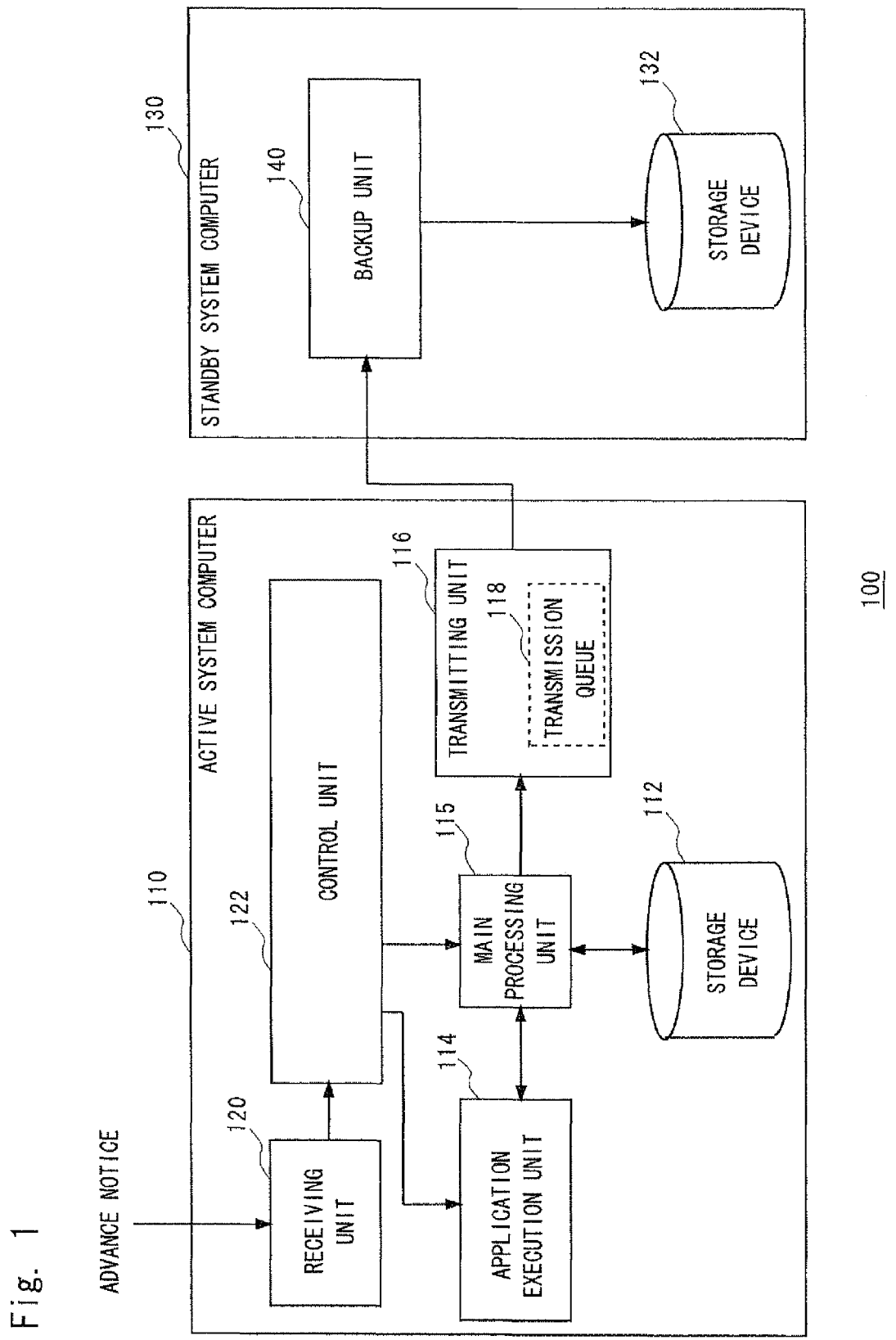
FIG. 1 is a diagram illustrating a computer system used to explain a principle of a technique according to the present invention.

The following explanation and drawings are omitted and simplified as appropriate for the clarity of the explanation. Moreover, each component illustrated in the drawings as functional blocks for performing various processes can be configured by a CPU, a memory, and other circuits as hardware, and can be realized by programs loaded into a memory as software. Therefore, the person skilled in the art would understand that these functional blocks can be realized only by hardware, software, or a combination thereof, and it is not limited to any of them. Further, a configuration of each device illustrated in the following drawings is realized by executing a program read out of a storage device, for example. Furthermore, these programs can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Before explaining specific exemplary embodiments of the present invention, firstly the principle of the technique according to the present invention is explained with reference to a computer system 100 illustrated in FIG. 1.

As shown in FIG. 1, the computer system 100 includes an active system computer 100 and a standby system computer 130 that are communicatively connected.

The active system computer 100 is a computer where a business application is being executed and asynchronous replication of data generated by executing the business application in the active system computer 110 is performed with the standby system computer 130.

As mentioned above, the asynchronous replication of the data indicates that write control is returned to the business application asynchronously with the process for transmitting the data to the standby system computer and the data is transmitted to the standby system computer, thereby serving to backup, instead that the data is transmitted to the standby system computer upon generation of the data and the control is returned to the business application after the transmission is completed. The generated data may be temporarily accumulated and the accumulated data may be collectively transmitted to the standby system computer at a predetermined trigger for example at a predetermined time interval or when processing load of the active system computer is small. Additionally, the standby system computer may write to a storage device included therein every time upon receiving the data from the active system computer or the data may be accumulated in a difference file and collectively read from the difference file at a predetermined trigger to be written to the storage device.

In the computer system 100, the data replication performed between the active system computer 110 and the standby system computer 130 may be any conventionally known asynchronous replication technique. Thus, details of the asynchronous replication and illustration of functional blocks necessary therefor are omitted except for the point necessary for explaining the technique according to the present invention.

As shown in FIG. 1, the computer system 100 includes a storage device 112, an application execution unit 114, a main processing unit 115, a transmitting unit 116, a transmission queue 118, a receiving unit 120, and a control unit 122.

The application execution unit 114 controls execution and stop of the business application.

The main processing unit 115 writes write data generated by executing the business application to the storage device 112 as well as accumulates the same data as the one written to the storage device 112 in the transmission queue 118.

The storage device 112 is a storage medium such as a hard disk that stores the data written by the main processing unit 115.

The transmitting unit 116 transmits to the standby system computer 130 the same data as the data written to the storage device 112 by the main processing unit 115, and the data transmission by the transmitting unit 116 is asynchronous to writing to the storage device 112 by the main processing unit 115. Specifically, the transmitting unit 116 includes the transmission queue 118, accumulates the same data as the data written to the storage device 112 by the main processing unit 115 in the transmission queue 118, and sequentially transmits to the standby system computer 130 when transmittable. Instead of the method of sequentially transmitting when transmittable, it may be collectively transmitted to the standby system computer 130 at a predetermined trigger.

The receiving unit 120 is for receiving an advance notice that gives a failure prediction and notifies the control unit 122 accordingly upon a receipt of the advance notice.

The "advance notice" is for predicting a failure in the active system computer 110 and may be any information that predicts the failure occurring in the active system computer 110. For example, it may be information from a failure prediction organization that predicts disasters including earthquakes at an installed place of the active system computer 110 or information from means that predicts the failure using a result of monitoring states of a memory and a CPU of the active system computer 110, for example.

When the receiving unit 120 receives the advance notice, the control unit 122 performs control for failure avoidance to the application execution unit 114 and the main processing unit 115.

Specifically, upon receiving the advance notice from the receiving unit 120, the control unit 122 causes the application execution unit 114 to stop executing the business application. Moreover, the main processing unit 115 is controlled so that transmission to the standby system computer 130 is performed in order of transmission start information, data transmission, and transmission completion information.

The aforementioned "data transmission" means sequentially transmitting the data stored to the transmission queue 118 to the standby system computer 130 in order to avoid the failure. In addition, the "transmission start information" and the "transmission completion information" is information that respectively indicates start and completion of the aforementioned data transmission.

The standby system computer 130 includes a storage device 132 and a backup unit 140. The storage device 132 is a recording medium such as a hard disk that stores data written by the backup unit 140. The backup unit 140 writes the data from the active system computer 110 to the storage device 132 by the asynchronous replication of data as well as writes the data received after the transmission start information to the storage device 132 upon receiving the aforementioned transmission start information from the active system computer 110 and also generates and holds first reliability guarantee information, which indicates that data received before the transmission start information is reliable data. Subsequently, upon receiving the transmission completion information from the active system computer 110, second reliability guarantee information, which indicates that data received before the transmission completion information is reliable data, is generated and held.

The aforementioned transmission start information and transmission completion information may be any format as long as start and completion of the "data transmission" can be notified from the active system computer 110 in order to avoid the failure. For example, the transmission start information may be a synchronization start packet indicating the start of the aforementioned "data transmission" or time information of a top queue of the data accumulated in the transmission queue of the aforementioned "data transmission, and the transmission completion information may be a synchronization completion packet indicating the completion of the aforementioned "data transmission" and time information of a last queue of the data accumulated in the transmission queue of the aforementioned "data transmission".

The first reliability guarantee information may be any format as long as it can indicate that the data received before the transmission start information is reliable data. For example, it can be the information indicating the data received last before the transmission start information. This applies to the second reliability information and may be any format as long as the data received before the transmission completion information can be indicated as reliable data. For example, it can be information indicating the data received last before the transmission completion information.

That is, in the computer system 100, the asynchronous replication of the data generated by the business application being executed on the active system computer 110 is performed between the active system computer 110 and the standby system computer 130 before the advance notice is received by the receiving unit 120 of the active system computer 110, and the data waiting to be transmitted to the standby system computer 130 is accumulated in the transmission queue 118 of the active system computer 110. The data accumulated in the transmission queue 118 is sequentially transmitted to the standby system computer 130 when transmittable. When the receiving unit 120 of the active system computer 110 receives the advance notice, the "data transmission", which transmits the data accumulated in the transmission queue 118 to the standby system computer 130, is started for failure avoidance. The transmission start information and the transmission completion information is respectively transmitted at the time of start and completion of this data transmission. Moreover, in the standby system computer 130, when the transmission start information is received, the first reliability guarantee information, which indicates that the data received before the transmission start information is reliable data, is held, and when the transmission completion information is received, the second reliability guarantee information, which indicates that the data received before the transmission completion information is reliable data, is held.

Meaning of the transmission start information, the transmission completion information, the first reliability guarantee information, and the second reliability guarantee information is explained with reference to FIG. 2. In FIG. 2, as for the transmission start information and the transmission completion information, "O" indicates that "the standby system computer 130 received" and "X" indicates that "the standby system computer 130 did not receive". Further, as for the first reliability guarantee information and the second reliability guarantee information, "O" indicates that "it is held to the standby system computer 130 and "X" indicates that "it is not held to the standby system computer 130".

Case 1

As shown in FIG. 2, when the standby system computer 130 has not received the transmission start information from the active system computer 110 (naturally the transmission completion information has not been received either), the first reliability guarantee information and the second reliability guarantee information is not held to the standby system computer 130. This case is a case when the advance notice for giving the failure prediction in the active system computer 110 is not received, for example when normal asynchronous replication is performed.

Case 2

Meanwhile, when the standby system computer 130 has received the transmission start information from the active system computer 110 and not the transmission completion information, the first reliability guarantee information is held to the standby system computer 130 but not the second reliability guarantee information. This case is a case when the active system computer 110 has received the advance notice and performed the data transmission, which is to transmit the data not transmitted yet to the standby system computer 130 (hereinafter may be referred to as "data synchronization"), however the data synchronization has not been completely performed, for example when the failure occurred during the data synchronization.

Case 3

Moreover, when the standby system computer 130 has received both the transmission start information and the transmission completion information from the active system computer 110, both the first reliability guarantee information and the second reliability guarantee information is held to the standby system computer 130. This case is a case where the data synchronization is performed after the active system computer 110 has received the advance notice, and this data synchronization is completely performed.

Therefore, when the standby system computer 130 is switched to the active system computer to execute the business application, it is possible to confirm the reliability of the data backed up on the storage device 132 of the standby system computer 130 and take measures such as from where to execute the business application.

For example, in the aforementioned case 2 where the "first reliability guarantee information" is held and the "second reliability guarantee information" is not held, it turns out that the data received before the transmission start information is reliable data and the business application can be executed from where the data is received last among the reliable data.

Further, in the aforementioned case 3 where the "first reliability guarantee information" and the "second reliability guarantee information" is both held, it turns out that the data received before the transmission completion information is reliable data and the business application can be executed from where the data is received last among the reliable data.

Such a configuration of the computer system 100 enables the asynchronous replication of the data between the active system computer 110 and the standby system computer 130 until the advance notice is received by the active system computer 110. When the advance notice is received by the active system computer 110, the data synchronization is performed between the active system computer 110 and the standby system computer 130 as well as the information of whether or not the data synchronization is complete, that is, how much of the data is reliable (the first reliability guarantee information and the second reliability guarantee information) is generated by and held to the standby system computer 130. Therefore, while taking advantage of the asynchronous replication in the data replication, the reliability of the data backed up on the standby system computer can be guaranteed upon the failure.

Additionally, in the computer system 100, the active system computer 110 can reduce the amount of data transmitted to the receiving unit 120 by the above data synchronization and increase the probability of complete data synchronization by stopping the business application in execution.

Figure 3:
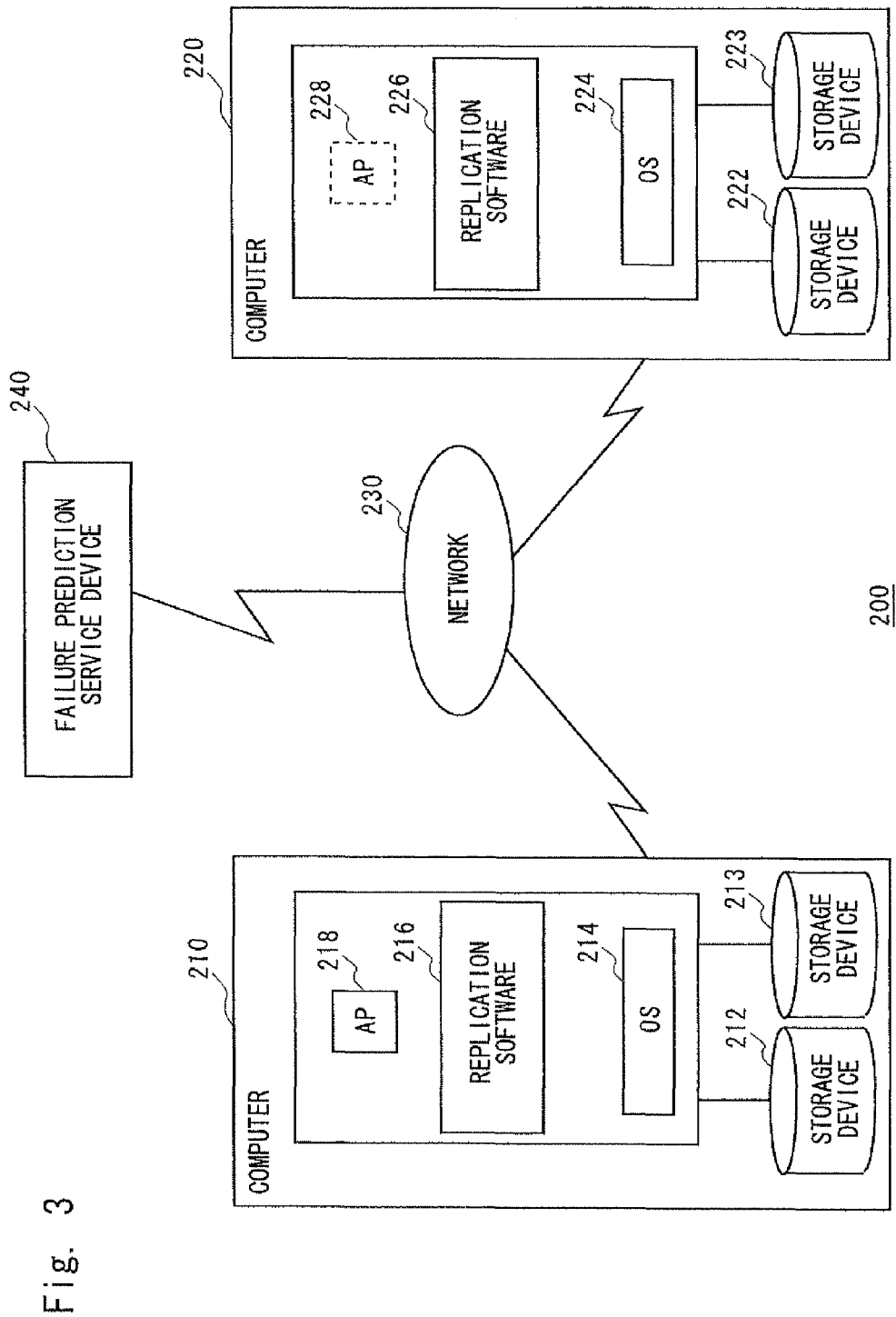
FIG. 3 is a diagram showing a computer system according to an exemplary embodiment of the present invention.

Next, an exemplary embodiment embodying the aforementioned principle is explained. FIG. 3 shows a computer system 200 according to the exemplary embodiment of the present invention. The computer system 200 includes a plurality of computers (in the drawing, only two of a computer 210 and a computer 220 are exemplified) and a failure prediction service device 240. These computers and the failure prediction service device 240 are connected via a network 230 such as LAN and WAN.

The plurality of computers included in the computer system 200 of this exemplary embodiment have similar configurations. As shown in FIG. 3, the computer 210 is mounted with an operating system (hereinafter referred to as an OS) 214, replication software 216, and a business application (hereinafter referred to as AP) AP 218 and includes a first storage device 212 to which the software reads and writes data and a second storage device 213, which is different from the first storage device 212. Similarly, the computer 220 is mounted with an OS 224, replication software 226, and an AP 228, and includes a first storage device 222 to which the software reads and writes data and a second storage device 223, which is different from the first storage device 222.

In the example shown in FIG. 3, the AP 218 mounted on the computer 210 and the AP 228 mounted on the computer 220 are the same business applications, the AP 218 surrounded by the solid line frame is in execution, and the AP 228 surrounded by the dotted line frame is stopped. That is, in this case, the computer 210 is the active system computer and the computer 220 is the standby system computer. Moreover, data generated by executing the AP 218 is transmitted to and backed up on the computer 220 by the asynchronous replication.

The failure prediction service device 240 transmits the advance notice for giving the failure prediction to the computer via the network 230. In this exemplary embodiment, the failure prediction service device 240 is for giving a prediction of natural disasters such as earthquakes that could generate the failure in the computer and is installed in an organization and the like that predict the disasters, for example.

In the computer system 200, the active system computer and the standby system computer usually perform the asynchronous data replication. This asynchronous replication is performed by the replication software mounted on the active system computer and the standby system computer. Upon receiving the advance notice, the active system computer stops the business application in execution as well as starts the data synchronization, and the standby system computer backs up the data transmitted from the active system computer in the data synchronization to its own storage device.

Figure 4:
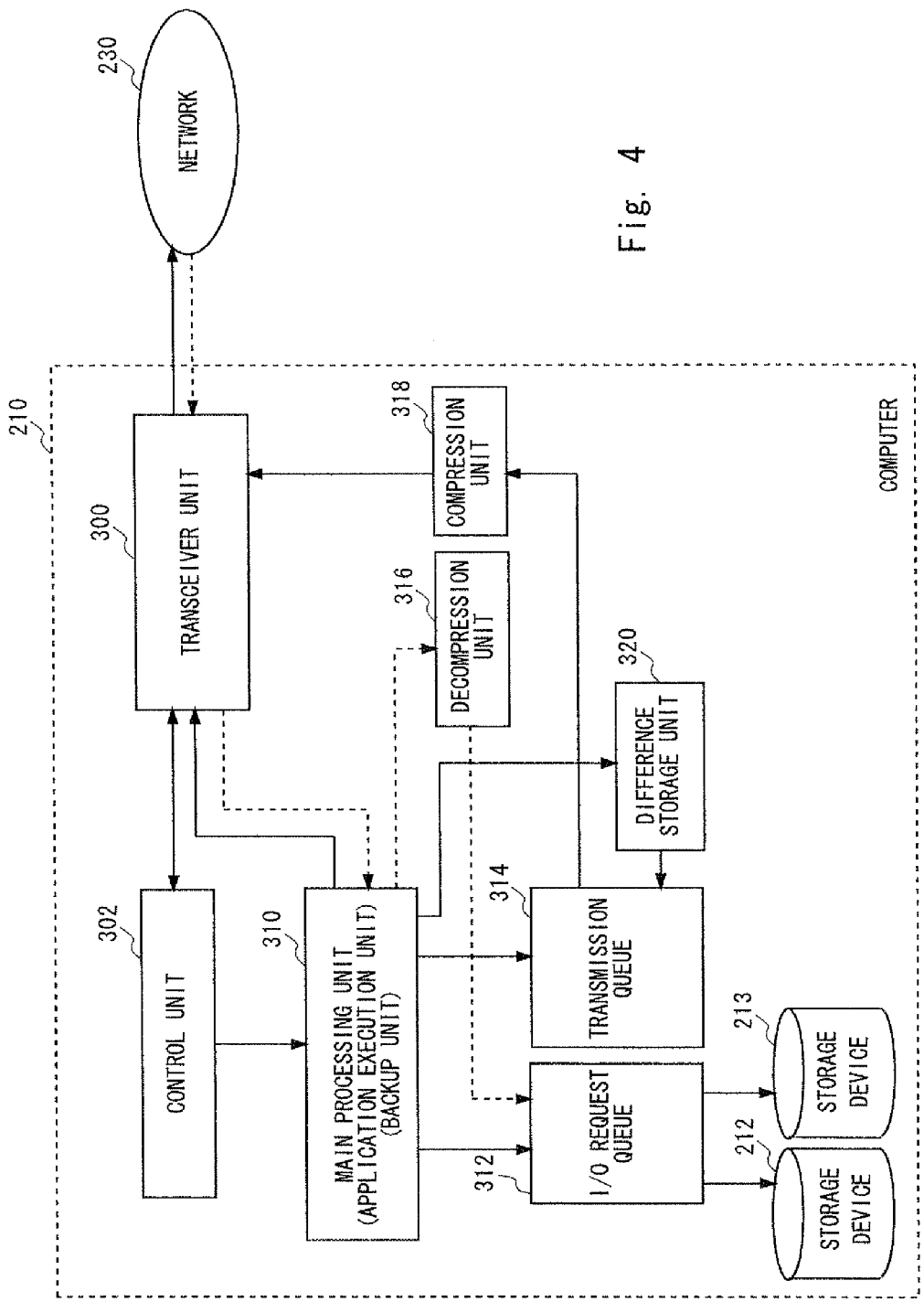
FIG. 4 is a diagram showing a configuration of each computer in the computer system shown in FIG. 3.

FIG. 4 shows a specific configuration of each computer in the computer system 200. Note that FIG. 4 illustrates only the part relating to the aforementioned "data synchronization" and illustration and explanation of other parts is omitted. Additionally, in this exemplary embodiment, as each computer has the same configuration, the computer 210 is explained as a representative.

As shown in FIG. 4, the computer 210 includes the first storage device 212, the second storage device 213, a transceiver unit 300, a control unit 302, a main processing unit 310, an I/O request queue 312, a transmission queue 314, a decompression unit 316, a compression unit 318, and a difference storage unit 320. These functional blocks are realized by collaboration of hardware included in and software installed on the computer 210.

The computer 210 can be any of the active system computer and the standby system computer. In FIG. 4, the solid lines between each functional block indicate flows of data and signals when the computer 210 is the active system computer, and the dotted lines indicate flows of data and signals when the computer 210 is the standby system computer.

The main processing unit 310 includes a function to execute the business application and a backup function. When the computer 210 is the active system computer, the function to execute the business application is executed, and when the computer 210 is the standby system computer, the backup function is executed. That is, when the computer 210 is the active system computer, the main processing unit 310 can operate as an application execution unit, and when the computer 210 is the standby system computer, the main processing unit 310 can operate as a backup unit.

Hereinafter, an operation of each functional block in the computer 210 is explained, separating the case of being active system computer and the case of being standby system computer.

<Case where Computer 210 is Active System Computer>

In this case, the main processing unit 310 queues the write data generated by executing the business application in the I/O request queue 312 and the transmission queue 314. Upon queuing in the transmission queue 314, while queuing temporary hold time information described later as additional time information together with the write data, the temporary hold time information is updated with this write time of occurrence (hereinafter referred to as write time).

A relationship between the write time of the data and the temporary hold time information is explained with reference to FIG. 5. As an example, writing of data 0, data 1, data 2, and data 3 is generated in order of time, and assume that the write time of the data is respectively time 0, time 1, time 2, and time 3.

The main processing unit 310 holds the latest write time of occurrence as the temporary hold time information. As shown in FIG. 5, writing of data 0 is generated at the time 0, and the time 0 is saved as the temporary hold time information.

Next, since writing of the data 1 is generated at the time 1, the temporary hold time information is updated with the time 1.

After that, the temporary hold time information is updated with the time 2 when the data 2 is written and updated with the time 3 when the data 3 is written.

Figure 6:
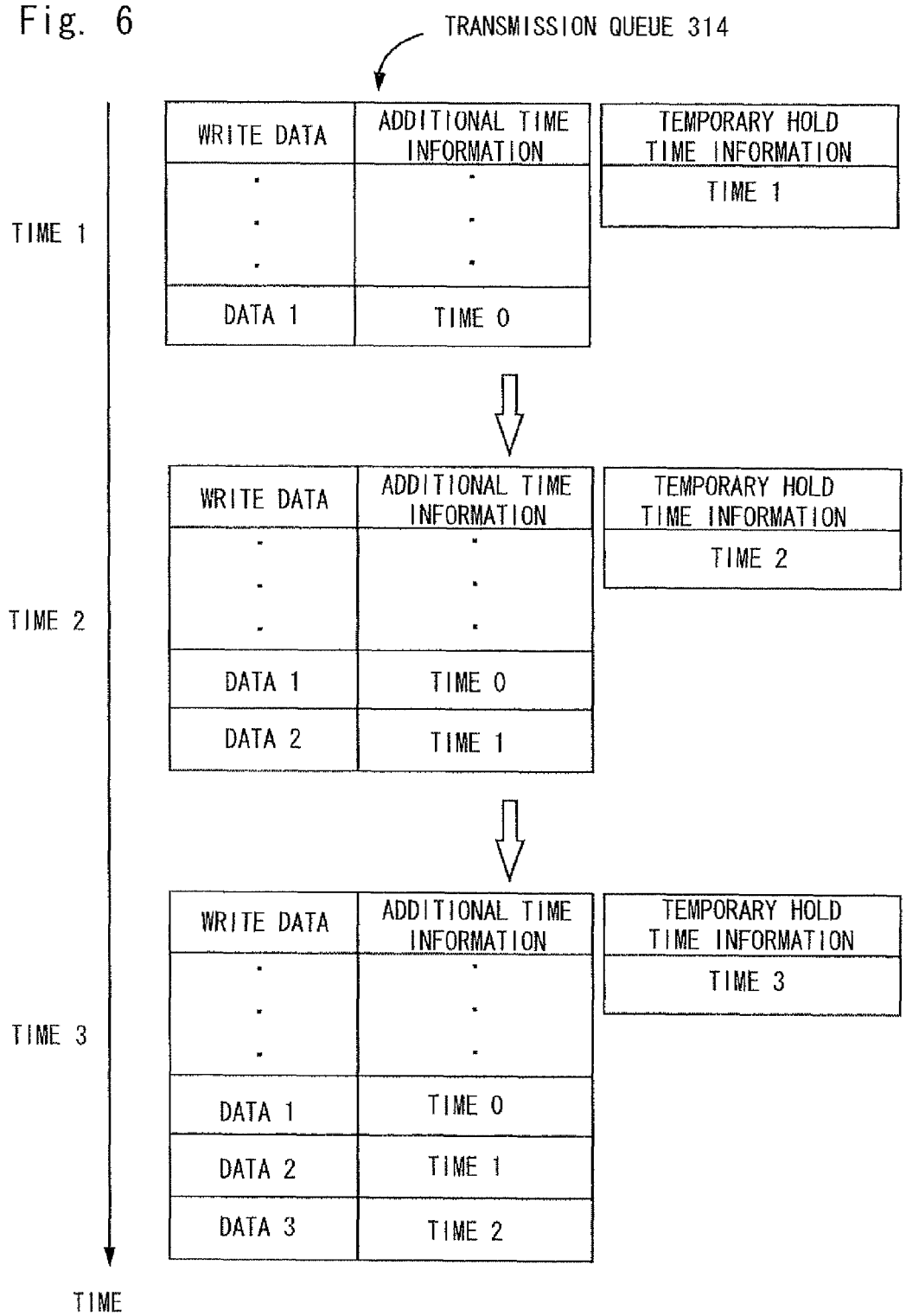
FIG. 6 is a diagram for explaining additional time information queued in the transmission queue together with the write data.

When the main processing unit 115 queues the write data in the transmission queue 314, the temporary hold time information before update is associated with the data to be queued. This is explained with reference to FIG. 6.

The temporary hold time information being held is the write time of the data 0 (time 0) immediately before the write time of the data 1 (time 1). Therefore, at the time 1, the data 1 is queued in the transmission queue 314 together with additional time information to be the time 0. Accordingly, the temporary hold time information is updated with the time 1.

Similarly, as the temporary hold time information is the time 1 immediately before the write time of the data 2 (time 2), at the time 2, the data 2 is queued in the transmission queue 314 together with the additional time information to be the time 1. Accordingly, the temporary hold time information is updated with the time 2.

Moreover, since the temporary hold time information is the time 2 immediately before the write time of the data 3 (time 3), at the time 3, the data 3 is queued in the transmission queue 314 together with the additional time information to be the time 2. Accordingly, the temporary hold time information is updated with the time 3.

That is, in this exemplary embodiment, the write data and the write time of the previous write data is associated and queued in the transmission queue 314.

The I/O request queue 312 queues out the queued data sequentially to the first storage device 212. The first storage device 212 stores the data from the I/O request queue 312.

Moreover, the transmission queue 314 sequentially queues out the queued write data to the compression unit 318. The compression unit 318 compresses the data from the transmission queue 314 and outputs the data to the transceiver unit 300. The transceiver unit 300 sequentially outputs the data from the compression unit 318 (hereinafter referred to as compressed data) to the standby system computer (the computer 220 in this case) via the network 230.

Each aforementioned process is performed in accordance with an asynchronous replication rule for data, and detailed explanation is omitted here.

Note that in the case of not being able to communicate with the standby system computer, the main processing unit 310 does not queue the data in the transmission queue 314 but stores the data to the difference storage unit 320. After that, when communication can be made with the standby system computer, the data stored to the difference storage unit 320 is queued in the transmission queue 314.

As mentioned above, in this exemplary embodiment, the advance notice from the failure prediction service device 240 is transmitted via the network 230. That is, the transceiver unit 300 of the computer 210 also serves as the receiving unit that receives this advance notice.

Upon the receipt of the advance notice, the transceiver unit 300 notifies the control 302 accordingly.

When the control unit 302 is notified of the receipt of the advance notice from the control unit 302, the control unit 302 outputs a start instruction of the data synchronization to the main processing unit 310 as well as outputs a stop instruction of the business application asynchronously with the start instruction of the data synchronization. Outputting the start instruction of the data synchronization without waiting for the business application to stop enables instant start of the data synchronization process and instant notification of the first reliability guarantee information to the standby system.

Upon a receipt of the stop instruction of the business application, the main processing unit 310 stops the business application. Then, there is no generation of new data by the business application.

Upon receiving the start instruction of the data synchronization, the main processing unit 310 operates as follows. First, the main processing unit 310 interrupts the transmission data accumulated in the transmission queue 314 and causes the transceiver unit 300 to transmit the "synchronization start packet" indicating start of the data synchronization. The additional time information of the top queue of the data accumulated in the transmission queue 314 is included in this synchronization start packet. This additional time information is the additional time information of the write data queued to the top of the transmission queue 314, that is, the write time of the previous write data.

Then, the transmission queue 314, the compression unit 318, and the transceiver unit 300 are controlled so that the write data accumulated in the transmission queue 314 is sequentially transmitted after the aforementioned "synchronization start packet".

When all the data accumulated in the transmission queue 314 is compressed and transmitted, the main processing unit 310 causes the transceiver unit 300 to transmit the "synchronization completion packet" indicating completion of the data synchronization. This synchronization completion packet is the current temporary hold time information, that is, the write time of the last queue of the data accumulated in the transmission queue 314.

In other words, upon the receipt of the advance notice that gives the failure prediction (disaster prediction in this exemplary embodiment) when the computer 210 is the active system computer, the business application in execution is stopped in the computer 210 and also the synchronization start packet, the compressed data of the data queued in the transmission queue 314, and the synchronization completion packet are transmitted from the computer 210.

<Case where Computer 210 is Standby System Computer>

In this case, the transceiver unit 300 receives data from the active system computer along with the asynchronous replication of the data. This data is the compressed data of the data generated during execution in the active system computer.

The main processing unit 310 causes the decompression unit 316 to decompress the compressed data received by the transceiver unit 300. The decompression unit 316 outputs the decompressed data to the I/O request queue 312.

The I/O request queue 312 sequentially queues out the data from the decompression unit 316 to the first storage device 212. The first storage device 212 stores the data from the I/O request queue 312.

The aforementioned process is the process by the standby system computer side when the asynchronous replication of the data is executed, and detailed explanation is omitted here.

When the transceiver unit 300 receives the "synchronization start packet", the main processing unit 310 outputs the additional time information included in the synchronization start packet to the I/O request queue 312 as the first reliability guarantee information. Moreover, the I/O request queue 312 is controlled to queue out this additional time information to the second storage device 213.

Further, the main processing unit 310 causes the decompression unit 316 to sequentially decompress each data received by the transceiver unit 300 after the "synchronization start packet" and output the data to the I/O request queue 312. The main processing unit 310 controls the I/O request queue 312 to queue out this data to the first storage device 212.

Additionally, when the transceiver unit 300 receives the "synchronization completion packet", the main processing unit 310 outputs the temporary hold time information included in the synchronization completion packet to the I/O request queue 312 as the second reliability guarantee information. Moreover, the I/O request queue 312 is controlled to queue out this temporary hold time information to the second storage device 213.

The meaning of the synchronization start packet, the synchronization completion packet, the first reliability guarantee information, the second reliability guarantee information in this exemplary embodiment is explained with reference to FIG. 7. In a similar manner as in FIG. 2, in FIG. 7, as for the synchronization start packet and the synchronization completion packet, "O" indicates that "the standby system computer received" and "X" indicates that "the standby system computer did not receive". Moreover, as for the first reliability guarantee information (the additional time information included in the synchronization start packet here) and the second reliability guarantee information (the temporary hold time information included in the synchronization completion packet here), "O" indicates that "it is recorded on the storage device of the standby system computer" and "X" indicates that "it is not recorded on the storage device of the standby system computer".

Case 1

As shown in FIG. 7, when the standby system computer has not received the synchronization start packet from the active system computer (naturally the synchronization completion packet has not been received either), the additional time information included in the synchronization start packet and the temporary hold time information included in the synchronization completion packet is not recorded on the second storage device of the standby system computer. This case is a case when the active system computer has not received the advance notice that gives the failure prediction, for example when normal asynchronous replication is performed.

Case 2

On the other hand, when the standby system computer has received the synchronization start packet from the active system computer and has not received the synchronization completion packet, the additional time information included in the synchronization start packet is recorded on the second storage device of the standby system computer but not the temporary hold time information included in the synchronization completion packet. This case is a case when the active system computer has received the advance notice and performed data transmission, which is to transmit data not transmitted yet to the standby system computer (hereinafter may be referred to as "data synchronization"), however the data synchronization has not been completely performed, for example when the failure occurred during the data synchronization.

Case 3

Further, when the standby system computer has received both the synchronization start packet and the synchronization completion packet from the active system computer, both the additional time information included in the synchronization start packet and the temporary hold time information included in the synchronization completion packet is recorded on the second storage device of the standby system computer. This case is a case when the data synchronization is performed after the active system computer has received the advance notice, and this data synchronization is completely performed.

Figure 8:
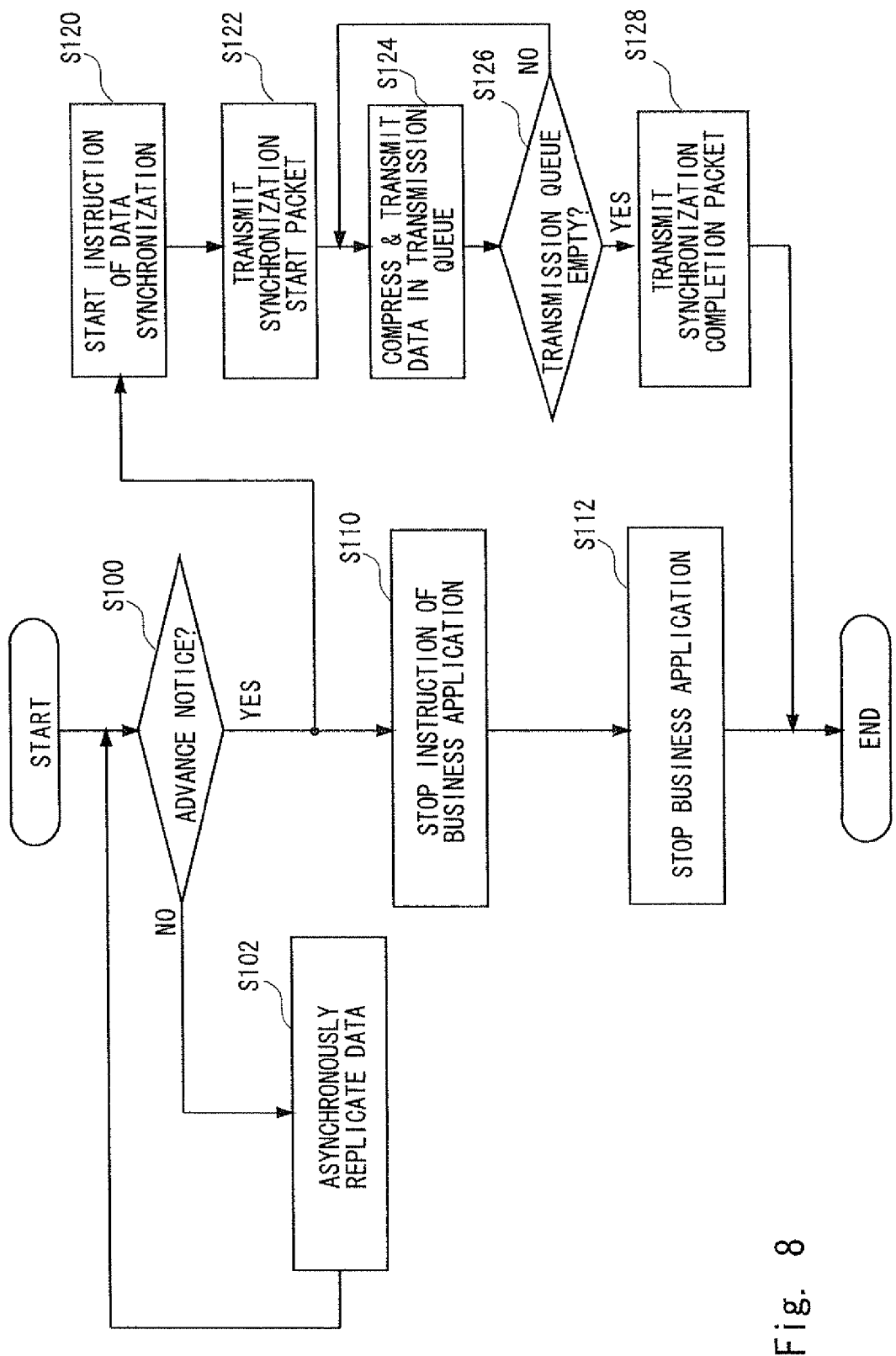
FIG. 8 is a flowchart showing a process of an active system computer in the computer system shown in FIG. 3.

FIG. 8 is a flowchart showing a flow of the process in the active system computer in the computer system 200.

As shown in FIG. 8, the active system computer executes the business application as well as performs the asynchronous replication of the data generated by executing the business application with the standby system computer until receiving the advance notice (S100: No, S102). The asynchronous replication of the data in the step S102 is specifically a process to return the write control to the business application asynchronously with the process of transmitting the data to the standby system computer, compress the data accumulated in the transmission queue, and transmit the data to the standby system computer.

In the active system computer, upon the receipt of the advance notice, the control unit issues a stop instruction of the business application and a data synchronization start instruction (S110 and S120).

Upon a receipt of the stop instruction of the business application, the main processing unit of the active system computer stops the business application in execution (S112).

Moreover, upon a receipt of the start instruction of the data synchronization, the main processing unit of the active system computer causes the transceiver unit to transmit to the standby system computer the synchronization start packet including the additional time information of the top queue of the data accumulated in the transmission queue, and then compress and transmit the data accumulated in the transmission queue until the transmission queue is emptied (S124, S126: No, and after S124).

When the compression and transmission of all data in the transmission queue is completed, the main processing unit causes the transmitting unit to transmit the synchronization completion packet including the temporary hold time information to the standby system computer.

Figure 9:
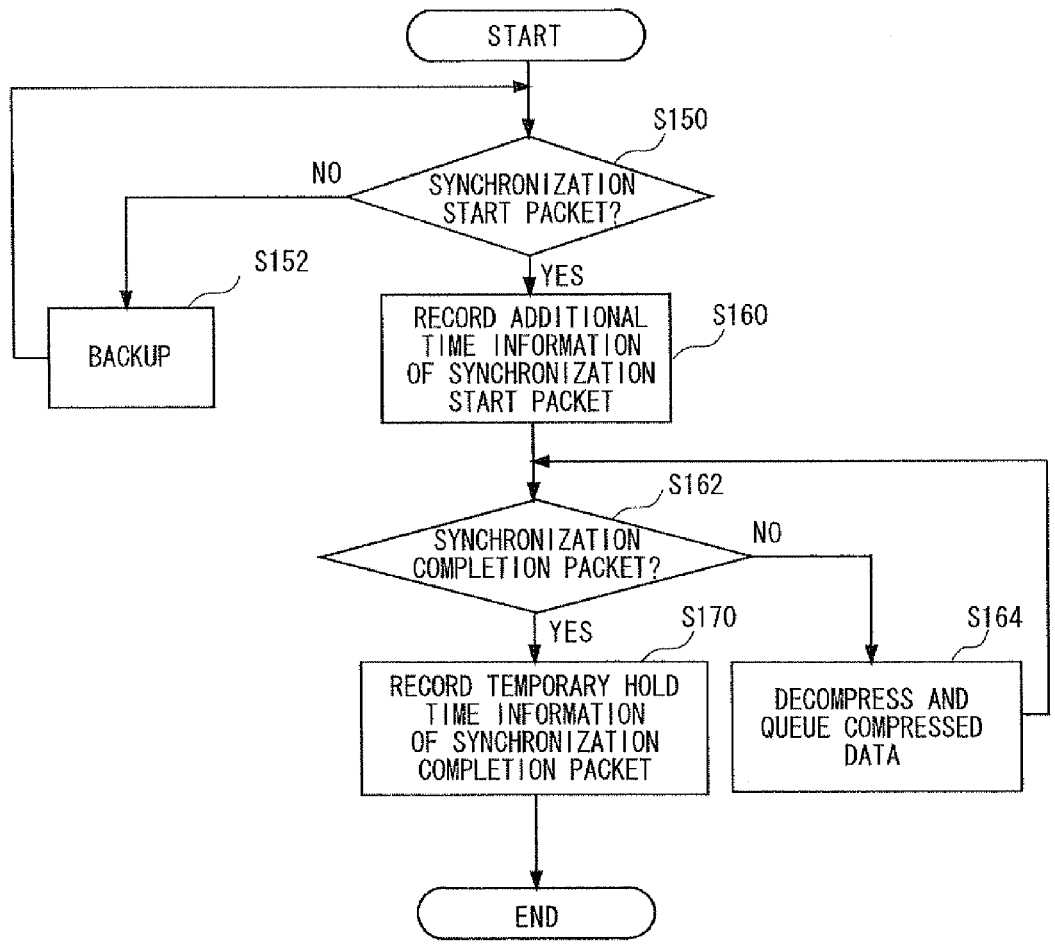
FIG. 9 is a flowchart showing a process of a standby system computer in the computer system shown in FIG. 3.

FIG. 9 is a flowchart showing a flow of the process in the standby system computer in the computer system 200.

As shown in FIG. 9, the standby system computer backs up the data from the active system computer (compressed data) until receiving the synchronization start packet from the active system computer (S150: No and S152). The backup in the step S152 is specifically the decompression of the compressed data from the active system computer, queuing in the I/O request queue, and queuing out from the I/O request queue to the first storage device.

Upon receiving the synchronization start packet, the main processing unit of the standby system computer records the additional time information included in the synchronization start packet on the second storage device as the first reliability guarantee information via the I/O request queue as well as backs up the compressed data from the active system computer and writes the compressed data to the first storage device until receiving the synchronization completion packet (S150: Yes, S160, S162:No, and after S164).

Upon the receipt of the synchronization completion packet, the main processing unit of the standby system computer records the temporary hold time information included in the synchronization completion packet on the second storage device as the second reliability guarantee information via the I/O request queue (S162: Yes and S170).

Figure 10:
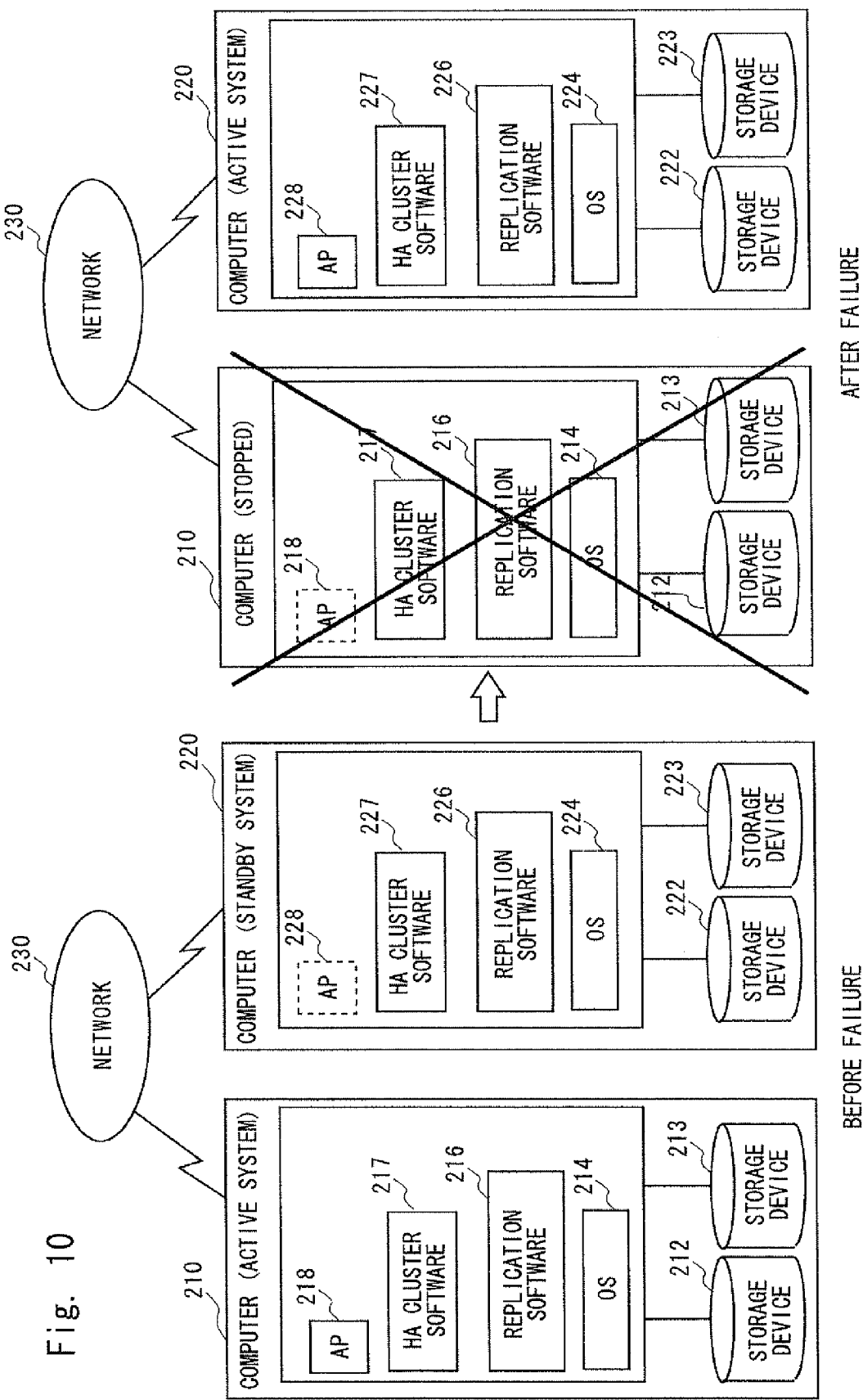
FIG. 10 is a diagram for explaining a switch after a failure in the computer system shown in FIG. 3.

FIG. 10 is an example of showing a manual or an automatic switch of the computer executing the business application after the failure occurred.

FIG. 10 shows an example when the HA cluster software is mounted on each computer together with the replication software. The HA cluster software mounted on each computer monitors the state of each other's computer and exclusively executes the business application. The replication software performs the asynchronous data replication among the computer on which the business application is executed, the one on which the business application is mounted, and the computer not executed. The HA cluster software also switches the computer to execute the business application when the failure occurs in the computer on which the business application is executed. This switch can be selected in the setting either by automatically or manually.

As shown in FIG. 10, this example is an example of switching when the computer 210 is the active system computer and the computer 220 is the standby system computer.

After the failure occurs, the computer 210, which has been the active system, is stopped. The HA cluster software 227 in the computer 220 executes the AP 228. Then, the computer 220, which has been the standby system, is switched to the active system. Note that upon execution of the AP 228, the HA cluster software 227 checks whether the additional time information included in the synchronization start packet and the temporary hold time information included in the synchronization completion packet is recorded on the second storage device 223 of the computer 220 and determines an execution start point of the AP 228 based on the checked result.

Specifically, when only the additional time information included in the synchronization start packet is recorded on the second storage device 223, the HA cluster software 227 executes the AP 228 at the point when the last data is obtained among the data transmitted and received before the transmission time, which is reliable data stored to the first storage device 222. Meanwhile, when the additional time information included in the synchronization start packet and the temporary hold time information included in the synchronization completion packet is both recorded on the second storage device 223, the HA cluster software 227 executes the AP 228 at the point when the last data is obtained among the data received before the synchronization completion packet, which is reliable data stored to the first storage device 222.

The computer system 200 of this exemplary embodiment is an example of embodying the computer system shown in FIG. 1, and each effect of the computer system 100 can be achieved.

Further, in the computer system 200, as the data is compressed to be transmitted between the active system computer and the standby system computer, the amount of data flowing through the network 230 can be reduced.

Furthermore, recording the first reliability guarantee information and the second reliability guarantee information on the second storage device, which is different from the first storage device, enables the standby system computer to match the data in the first storage device of the active system computer and the standby system computer.

The present invention has been explained based on the exemplary embodiments so far. The exemplary embodiments are examples and various modifications, additions, subtractions, and combinations can be made to each of the above exemplary embodiments without departing from the scope of the present invention. The person skilled in the art would understand that variations including these modifications, additions, subtractions, and combinations are in the scope of the present invention.

For example, in the computer system 200, both functions of the active system computer and the standby system computer are mounted on each computer. However, both of the aforementioned functions may be mounted only on the computer to be a server, for example. Moreover, in this case, only the function of the active system computer may be mounted on the active system server and only the function of the standby system computer may be mounted on the standby system server.

Further, operations can be carried out in a way that the function of the active system computer is mounted on an active system shared storage device and also the function of the standby computer is mounted on a standby system shared storage.

Furthermore, although the computer system 200 is explained to receive the advance notice via the network, the advance notice may be received by any communication system such as wireless radio as long as the advance notice can be received.

The present application claims priority rights of and is based on Japanese Patent Application No. 2010-050784 filed on Mar. 8, 2010 in the Japanese Patent Office, the entire contents of which are hereby incorporated by reference.

INDUSTRIAL APPLICABILITY

The present invention can be used for backup of data in a computer system that replicates data, especially in an asynchronous method.

REFERENCE SIGNS LIST

100 COMPUTER SYSTEM
110 ACTIVE SYSTEM COMPUTER
112 STORAGE DEVICE
114 APPLICATION EXECUTION UNIT
115 MAIN PROCESSING UNIT
116 TRANSMITTING UNIT
118 TRANSMISSION QUEUE
120 RECEIVING UNIT
122 CONTROL UNIT
130 STANDBY SYSTEM COMPUTER
132 STORAGE DEVICE
140 BACKUP UNIT
200 COMPUTER SYSTEM
210 COMPUTER
212 FIRST STORAGE DEVICE
213 SECOND STORAGE DEVICE
214 OS
216 REPLICATION SOFTWARE
217 HA CLUSTER SOFTWARE
218 APPLICATION
220 COMPUTER
222 FIRST STORAGE DEVICE
223 SECOND STORAGE DEVICE
224 OS
226 REPLICATION SOFTWARE
227 HA CLUSTER SOFTWARE
228 APPLICATION
230 NETWORK
240 FAILURE PREDICTION SERVICE DEVICE
300 TRANSCEIVER UNIT
302 CONTROL UNIT
310 MAIN PROCESSING UNIT
312 I/O REQUEST QUEUE
314 TRANSMISSION QUEUE
316 DECOMPRESSION UNIT
318 COMPRESSION UNIT
320 DIFFERENCE STORAGE UNIT

The invention claimed is:

1. A computer system comprising:
an active system computer configured to execute a business application; and
a standby system computer configured to perform asynchronous replication of data with the active system computer, the data being generated by executing the business application on the active system computer,
wherein the active system computer comprises:
a first storage device configured to have data written thereto by the business application;
a transmission queue configured to queue data to be transmitted to the standby system computer among the data written to the first storage device by the business application;
receiving means configured to receive an advance notice for giving a failure prediction;

control means configured to stop the execution of the business application when the receiving means receives the advance notice; and transmitting means configured to transmit, to the standby system computer, transmission start information indicating a start of data transmission for failure avoidance, the data queued in the transmission queue, and transmission completion information indicating completion of the data transmission in this order when the receiving means receives the advance notice, wherein the standby system computer comprises:

a second storage device; and backup means configured to write the data from the active system computer to the second storage device along with the asynchronous replication, wherein the backup means is further configured to:

write, upon a receipt of the transmission start information, the data received after the transmission start information to the storage device, and generate and hold first reliability guarantee information indicating that the data received before the transmission start information is reliable data, and generate and hold, upon a receipt of the transmission completion information, second reliability guarantee information indicating that the data received before the transmission completion information is reliable data, wherein the transmission start information comprises a write time of previous data generated before data queued at a front of the transmission queue in the active system computer, wherein the transmission completion information comprises a write time of data queued at a back of the transmission queue, and wherein the backup means is further configured to hold the write times included in the transmission start information and the transmission completion information as the first reliability guarantee information and the second reliability guarantee information, respectively.

2. An active system computer configured to execute a business application and perform asynchronous replication of data generated by executing the business application with a standby system computer, the active system computer comprising:

a storage device configured to have data written thereto by the business application;

a transmission queue configured to queue data to be transmitted to the standby system computer among the data written to the storage device by the business application;

receiving means configured to receive an advance notice for giving a failure prediction;

control means configured to stop the execution of the business application when the receiving means receives the advance notice; and transmitting means configured to transmit, to the standby system computer, transmission start information indicating a start of data transmission for failure avoidance, the data queued in the transmission queue, and transmission completion information indicating completion of the data transmission in this order when the receiving means receives the advance notice, wherein the transmission start information comprises a write time of previous data generated before data queued at a front in the transmission queue, and wherein the transmission completion information comprises a write time of data queued at a back of the transmission queue.

3. A standby system computer configured to perform asynchronous replication of data with an active system computer, the data being generated by executing a business application on the active system computer, the standby system computer comprising:

a storage device; and backup means configured to write the data from the active system computer to the storage device along with the asynchronous replication, wherein the backup means is further configured to:

write, upon a receipt of transmission start information from the active system computer, the transmission start information indicating start of data transmission performed for failure avoidance when the active system computer receives an advance notice for giving a failure prediction and data received after the transmission start information to the storage device, generate and hold first reliability guarantee information indicating that the data received before the transmission start information is reliable data, and generate and hold, when the active system computer receives transmission completion information indicating completion of the data transmission, second reliability guarantee information indicating that the data received before the transmission completion information is reliable data, wherein the transmission start information comprises a write time of previous data generated before data queued at a front of a transmission queue in the active system computer, wherein the transmission completion information comprises a write time of data queued at a back of the transmission queue, and wherein the backup means is further configured to hold the write times included in the transmission start information and the transmission completion information as the first reliability guarantee information and the second reliability guarantee information, respectively.

4. The standby system computer according to claim 3, further comprising another storage device different from the storage device, wherein the backup means is further configured to hold the first reliability guarantee information and the second reliability guarantee information by writing to the another storage device.

5. A non-transitory computer readable medium storing a program that causes an active system computer, on which a business application is executed, that can receive an advance notice for giving a failure prediction, and asynchronous replication of data generated by executing the business application is performed with a standby system computer, to execute a process comprising:

upon a receipt of the advance notice, stopping the execution of the business application; and transmitting to the standby system computer transmission start information indicating start of data transmission for failure avoidance, data not previously transmitted to the standby system computer among data stored to a storage device by the business application, and transmission completion information indicating completion of the data transmission in this order, wherein the transmission start information comprises a write time of previous data generated before data queued at a front of a transmission queue in the active system computer, and wherein the transmission completion information comprises a write time of data queued at a back of the transmission queue.

6. A non-transitory computer readable medium storing a program that causes a standby system computer, on which asynchronous replication of data generated by executing a business application on an active system computer is performed with the active system computer, to execute a process comprising:

writing, upon a receipt of transmission start information from the active system computer, the transmission start information indicating start of data transmission performed for failure avoidance when the active system computer receives an advance notice for giving a failure prediction and also transmission of the data not transmitted yet to the standby system computer, the data received after the transmission start information to the storage device;

generating and holding first reliability guarantee information indicating that the data received before the transmission start information is reliable data; and generating and holding, when the active system computer receives transmission completion information indicating completion of the data transmission, reliability information indicating that the data received before the transmission completion information is reliable data, wherein the transmission start information comprises a write time of previous data generated before data queued at a front of a transmission queue in the active system computer, and wherein the transmission completion information comprises a write time of data queued at a back of the transmission queue.

\* \* \* \* \*